Aug. 23, 1960     A. M. COCHRAN, JR     2,949,924

FLUID PROPORTIONING DEVICE

Filed Feb. 3, 1958     2 Sheets-Sheet 1

ARTHUR MELVIN COCHRAN JR.
INVENTOR.

BY Mason & Graham

ATTORNEYS

Aug. 23, 1960 A. M. COCHRAN, JR 2,949,924
FLUID PROPORTIONING DEVICE
Filed Feb. 3, 1958 2 Sheets-Sheet 2

ARTHUR MELVIN COCHRAN JR.
INVENTOR.

BY Mason Graham

ATTORNEYS

United States Patent Office 2,949,924
Patented Aug. 23, 1960

2,949,924

FLUID PROPORTIONING DEVICE

Arthur Melvin Cochran, Jr., 3536 Ross St., Arlington, Calif.

Filed Feb. 3, 1958, Ser. No. 713,039

1 Claim. (Cl. 137—99)

This invention has to do with improvements in fluid proportioning devices for use in situations in which it is desired to obtain a predetermined division of fluid, such for instance as hydraulic fluid, moving from a common source of fluid under pressure to a plurality of lines leading for instance to fluid actuated motors.

I am aware that fluid proportioning devices generally are old in the art. However, those of which I am aware have been, because of their inherent design, rather complicated and bulky and are not always dependable to effect accurate predetermined proportioning. For instance, in airplane construction, it is important not only that an equalized flow of hydraulic fluid be obtained to the various parts being hydraulically actuated in unison, but also that the proportioning device itself be sufficiently small, compact and self-contained as to be capable of being mounted in an extremely small space and one which does not require frequent servicing.

It is, therefore, an object of my invention to provide a fluid proportioning device which overcomes those disadvantages of prior devices; one which, when interposed between a source of fluid under pressure and a plurality of fluid actuated devices, is capable of accurately proportioning or metering the fluid, and one which is also sufficiently compact and self-contained that may be mounted in a small space and does not require frequent, if any, servicing.

Another object of my invention is to provide a fluid proportioning device which, because of its novel design and construction, is capable of being economically produced.

Still further objects and advantages will become apparent to those skilled in the art from the following description of a presently preferred embodiment of my invention, for which purpose I shall refer to the accompanying drawings, in which.

Figure 1:
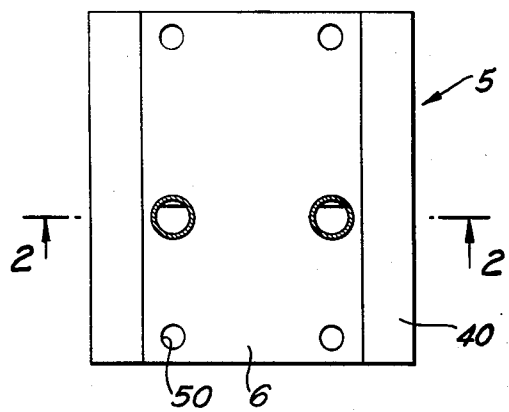
Fig. 1 is a top plan view.
Figure 2:
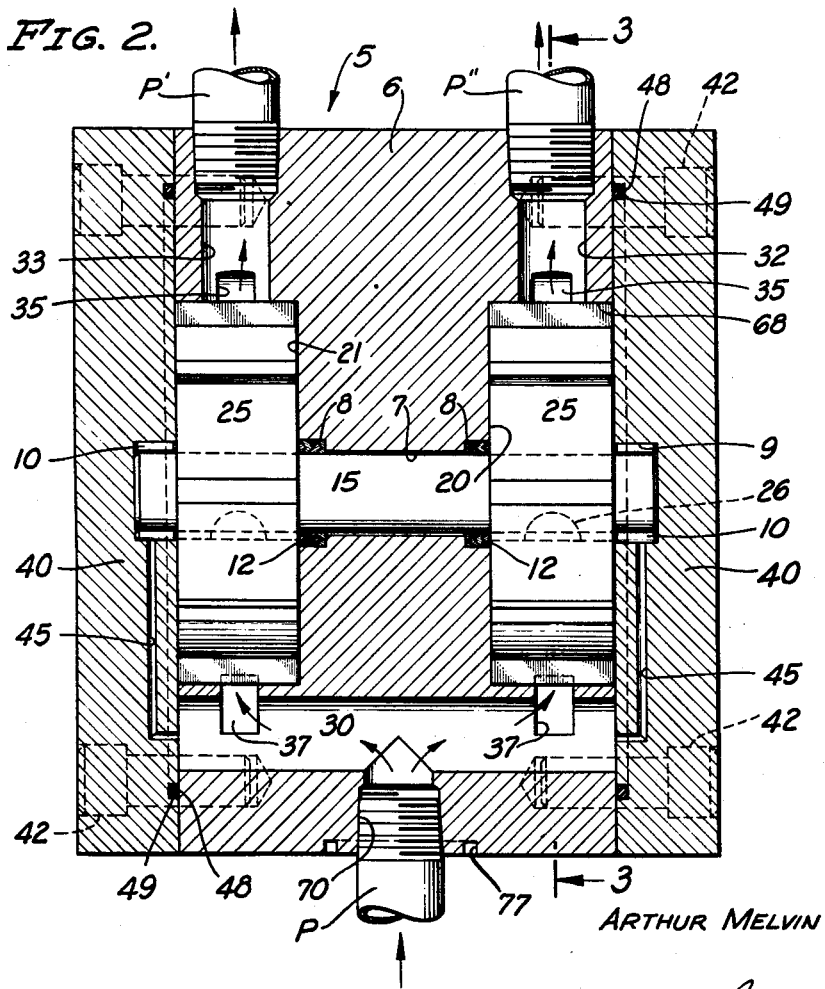
Fig. 2 is an enlarged section taken on line 2—2 of Fig. 1.
Figure 3:
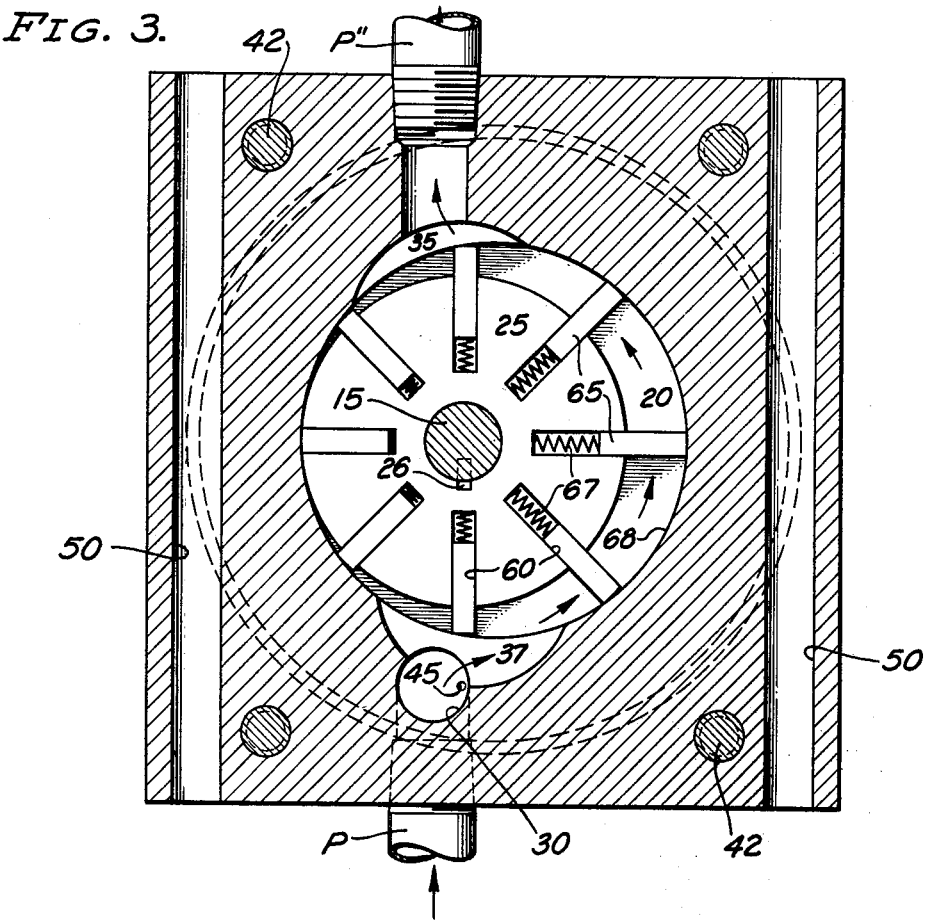
Fig. 3 is a section taken on line 3—3 of Fig. 2.

I wish it understood, however, that, within the broader scope of the invention as defined by the appended claim, the details of construction and arrangement now to be described may be modified.

Referring now to the drawings, the numeral 5 generally denotes my fluid proportioning device. It comprises a central block or stator 6, preferably made of metal, in which I form a transverse bore 7 having enlarged diameter portions 8 to receive seal rings and having enlarged diameter end portions 9 to receive bearings 10, preferably needle bearings.

A shaft 15 is rotatably disposed in the bore 7, having its ends journaled in the bearings 10. Seal rings 12 are mounted in the portions 8 around the shaft to prevent fluid from passing from one of the rotor chambers (to be described) to the other.

In each of the two opposite side surfaces of the block 6, I form, as by machining, a round cavity or chamber 20, 21 in each of which chambers I eccentrically dispose a rotor 25, fixedly secured on the shaft 15 as by keys 26.

I also form a second bore, or inlet chamber, 30 in the block 6 below the chambers 20, 21, and form in the block 6 above each of the chambers an outlet bore 32, 33. Each of the outlet bores communicates with the contiguous rotor chamber through an arcuate recess 35 of smaller radius than surface 68, and the inlet chamber 30 communicates with each of the respective rotor chambers through an arcuate recess 37 also of smaller radius than surface 68.

Each of the rotor chambers 20, 21 is closed at its outer side by a side plate 40 secured to the block 6 by screws 42 whose heads are preferably countersunk to be flush with the outer surface of the side plate. In each of the side plates, I form lubricant passageways 45 leading from the inlet chamber 30 to the respective bearings 10, so that the bearings may be kept lubricated by the fluid being proportioned by the device. Also, in the inner face of each of the side plates, I form an annular recess 48, in each of which recesses I mount a seal ring 49.

Bores 50 may be formed in the block 6 for the reception of attaching bolts or other means by which the device is mounted for use.

Figure 5:
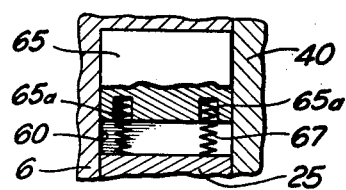
Fig. 5 is a fragmentary sectional view showing one of the vane elements and its associated springs.

Each of the rotors 25 has a thickness equal to the width of the rotor chamber in which it is mounted, and in each of the rotors I form radial slots 60 which open through the sides and periphery of the rotor. In each of these slots, I slideably mount a plate or vane 65, whose width is equal to that of the rotor. Each of the vanes is resiliently urged radially outwardly of the slot into wiping engagement with the surface 68 by springs 67 bearing at its inner end against the inner end of the slot and bearing at its outer end against the inner end of the vane. As shown in Fig. 5, a pair of recesses 65a are provided in the inner end of each vane and I provide a pair of the springs 67 whose outer ends engage in the respective recesses.

A supply pipe P is threaded into an inlet opening 70 in the block 6 which communicates with the inlet chamber 30; and an outlet pipe P′, P″ is threaded into each of the outlet bores 32, 33, the latter pipes leading to the fluid actuated devices being operated by the fluid proportioned by my device, those fluid actuated devices being here shown to be fluid motor 75, 76, each consisting of a conventional cylinder and piston. Instead of using the supply pipe P, the block 6 may be mounted in communication with an outlet opening in a fluid supply, and for this purpose I provide in the bottom of the block an annular recess 77 to receive a packing ring, the recess surrounding the inlet opening 70.

In operation, fluid, such as hydraulic fluid, enters the inlet chamber 30 through pipe P from a source of fluid under pressure, not shown. From the inlet chamber the fluid passes into the rotor chambers 20, 21 and, in order to reach the circumferentially spaced outlet pipes P′, P″, the fluid must impart rotative movement to the rotors by impinging against the vanes 65. As rotative movement is thus imparted to the rotors, the springs 67 maintain the outer ends of the vanes in wiping engagement with the surfaces 68 of block 6 defining the rotor chambers while said surface portions cam the vanes inwardly against the yieldable resistance of the springs as the rotors are rotated.

Inasmuch as both rotors are fixed on a common shaft, they must necessarily rotate at the same speed, so that an equal amount of fluid is delivered to each of the outlet pipes.

Figure 4:
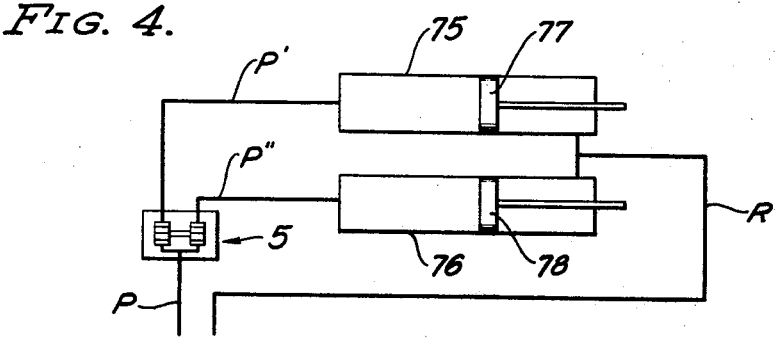
Fig. 4 is a schematic view showing my fluid proportioning device embodied in a fluid system.

Of course, as will be apparent, the device is operable to permit the fluid under pressure to return through the proportioning device in the opposite direction to that before described, as would occur when fluid is introduced through line R (Fig. 4) behind the pistons 77, 78 in the fluid motors.

I claim:

In a fluid metering device, a body having circular and parallel surfaces together defining a pair of parallel cavities of equal size, a shaft journaled in said body between and eccentric to said cavities, a pair of rotors secured on said shaft for rotation in and eccentric to said respective cavities, each of said rotors having a width equal to the width of said respective cavities and having substantially equidistantly circumferentially spaced radial slots opening through its side and peripheral surfaces, a vane radially slideably mounted in each of said slots, for wiping engagement with said circular surfaces, said vanes being coextensive in width with said respective rotors, and resilient means yieldably urging each of said vanes radially outwardly of its carrying slot; each of said circular surfaces being interrupted, at two points spaced apart circumferentially thereof in the direction of rotation of the respective rotors, by relatively narrow surface portions curved about relatively smaller radii whereby to define a fluid inlet chamber and a fluid outlet chamber; the said surfaces exposed to wiping engagement by said vanes being of greater length from said inlet chambers to said outlet chambers than from said outlet chambers to said inlet chambers, when considered in the direction of rotation of said rotors.

References Cited in the file of this patent

UNITED STATES PATENTS

| | | |
|---|---|---|
| 2,344,465 | Lauck | Mar. 14, 1944 |
| 2,541,405 | Chapman | Feb. 13, 1951 |
| 2,567,997 | Granberg | Sept. 18, 1951 |
| 2,724,341 | Bilas | Nov. 22, 1955 |
| 2,755,740 | McKean | July 24, 1956 |
| 2,873,889 | Mori | Feb. 17, 1959 |
| 2,878,753 | Adams | Mar. 24, 1959 |

FOREIGN PATENTS

| | | |
|---|---|---|
| 766,435 | France | June 28, 1934 |